R. C. BENNER & H. F. FRENCH.
ELECTRIC BATTERY.
APPLICATION FILED OCT. 22, 1915.

1,225,306.

Patented May 8, 1917.

WITNESS
H. G. Grover

INVENTORS
RAYMOND C. BENNER
HARRY F. FRENCH
BY Ira J. Adams,
ATTORNEY

UNITED STATES PATENT OFFICE.

RAYMOND C. BENNER AND HARRY F. FRENCH, OF FREMONT, OHIO, ASSIGNORS TO NATIONAL CARBON COMPANY, A CORPORATION OF NEW JERSEY.

ELECTRIC BATTERY.

1,225,306.  Specification of Letters Patent.  Patented May 8, 1917.

Application filed October 22, 1915. Serial No. 57,231.

*To all whom it may concern:*

Be it known that we, RAYMOND C. BENNER and HARRY F. FRENCH, citizens of the United States, residing at Fremont, in the county of Sandusky and State of Ohio, have invented a certain new and useful Improvement in Electric Batteries, of which the following is a full, clear, and exact description.

This invention relates to electric batteries and is particularly adapted to the so-called dry cell.

One object of the improvement is to construct the cell container in such a way that there will be no leakage when the zinc electrode is corroded through.

Another object is to produce a dry cell with no more zinc than is necessary for electrolytic consumption.

Other objects will appear in the appended description with reference to the drawings in which:—

In the usual type of dry cell the zinc electrode is made in the shape of a liquid tight can, so as to serve both as the positive electrode and the cell container. In order to prevent the container from being corroded through before the chemical activity of the cell is reduced to the minimum point, it has always been the practice to use about three times as much zinc as is necessary to produce the electro-chemical action during the useful life of the cell.

It has always been the practice to make the bottom of the cell container of zinc of the same gage as the cylindrical portion. There is very little advantage in having the bottom of the container a part of the zinc electrode. In fact, in certain aspects it is a distinct disadvantage. When the bottom of the can is permitted to be attacked by the electrolyte and corroded through, the leaking is much more serious than if the corrosion occurred in the upper part of the cell.

In our improvement the disadvantages above set forth are overcome, and the manner in which this is accomplished will now be explained.

Figure 1:
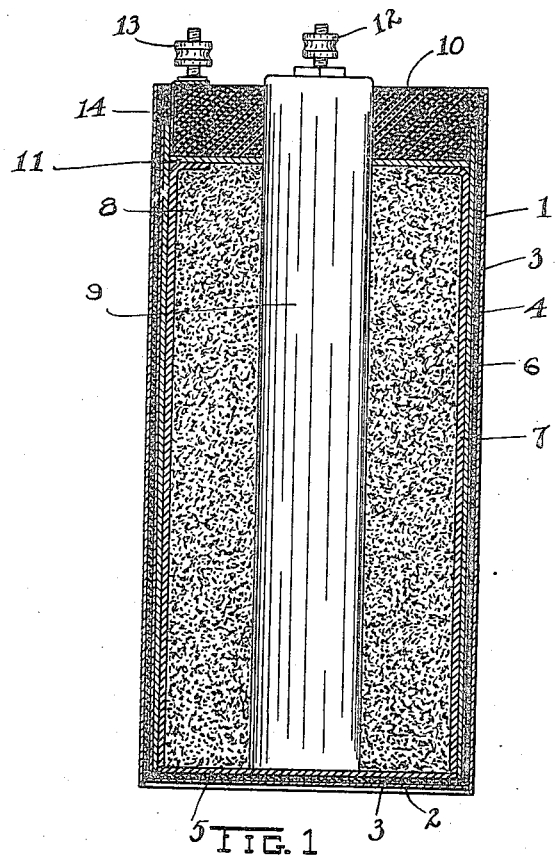
Figure 1 is a cross section through a typical form of dry cell embodying our improvement.

Referring to Fig. 1, the cell container 1 is made of galvanized or tinned iron or terne plate of thickness sufficient to furnish the necessary mechanical strength. The tinned plate container is soldered or lock-seamed at the side and has a bottom 2 of similar material soldered or otherwise secured in one end. After having formed the container as described, the entire inside and bottom are coated with some adhering substance 3, such as pitch, asphaltum or varnish which will completely protect the container from the action of the chemicals used in the cell. This may best be accomplished by pouring the compound in a molten condition into the container and then pouring it out again, which leaves an adherent coating. After the coating is cool or dry a thin oiled paper lining 4 is smoothed around inside the cell against the coating, so as to protect it and leave a smooth, non-adhesive surface inside the container.

One or more cardboard disks 5 are then placed in the bottom of the container and a thin cylindrical zinc 6 is placed inside the paper lining 4. This zinc is not soldered along its side, and is open at both ends. The zinc may be of thin gage, say about $\frac{1}{3}$ the thickness usually employed in dry cells. Since it plays no part in preventing the leaking of the electrolyte or in adding to the mechanical strength, it need be made only thick enough to furnish the requisite electrical energy.

Figure 2:
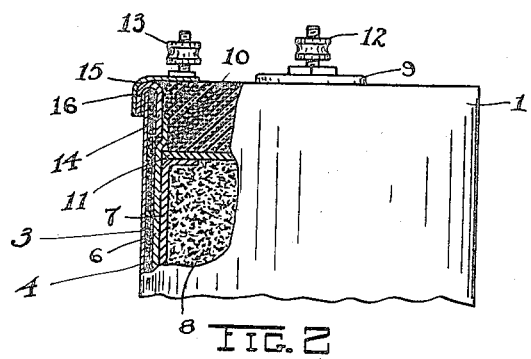
Fig. 2 is a partial section of the upper end of the dry cell somewhat enlarged, showing a modified terminal connection.

The usual bibulous lining 7 may be placed inside the zinc and the mix 8 tamped in around the carbon electrode 9 and sealed by pouring an appropriate molten substance 10 on top of one or more cardboard disks 11. The carbon electrode may have any type of binding post 12 and the other terminal may consist of an appropriate binding post 13 secured to a metal strip 14 which in turn may be soldered to the interior of the zinc 6, as shown in Fig. 1, or it may be soldered to a strip 15 which in turn is soldered to the outside of the zinc can, as shown in Fig. 2. In case that the latter construction is employed a paper or fabric insulating lining 16 separates the U-shaped strip 15 from the tinned iron container 1, so as to insulate the two. This latter insulation is not absolutely necessary, but in case that the electrolyte should penetrate to the iron container through defects in the pitch lining, the container would be connected directly to the positive electrode if the strip 15 were not insulated therefrom.

It is not necessary but it is preferable to shorten the zinc electrode so that it extends but half way up through the seal 10.

With the improved form of cell as described, it will be apparent that the cost of the cell will be considerably lowered, and in addition the leaking of electrolyte will be practically eliminated.

It will be understood that the usual paper jackets will incase the dry cell, but to simplify the showing these have not been illustrated on the drawing.

The function of the paper lining 4 is to protect the pitch, asphaltum or varnish coating. This, however, is not absolutely necessary in all cases, and therefore the lining may be omitted, in which case the zinc would be placed directly inside the lining of the sheet metal container.

Having described our invention, what we claim is:—

1. In electric batteries, a sheet metal container, a bottom plate secured in one end of said container, a lining of pitchy material covering the inside of said container and bottom plate, a paper lining adhering to the inside surface of said pitchy material, and a zinc electrode inside said coating of pitchy material.

2. In electric batteries, a sheet metal container, a bottom plate in one end of said container, a coating of pitchy material inside of the container and bottom plate, a paper lining inside of said pitchy material, a thin zinc electrode fitting inside of said paper lining and a cardboard disk on top of the pitchy lining on said bottom plate.

3. In electric batteries, a sheet metal container, a metal bottom plate closing one end of the container, a coating of pitchy material on the inside of said container and bottom plate, a paper lining inside of the coating, a thin zinc electrode inside of the paper lining, a conducting strip secured to said zinc electrode and passing up over the edge of the container, a layer of insulating material between said strip and the container and a binding post secured to said strip.

In testimony whereof, we hereunto affix our signatures.

RAYMOND C. BENNER.
HARRY F. FRENCH.